(12) United States Patent
Craig et al.

(10) Patent No.: US 7,536,072 B2
(45) Date of Patent: May 19, 2009

(54) ALUMINUM ALLOYS FOR ARMORED CABLES

(75) Inventors: Cheryl L. Craig, Simpsonville, KY (US); Phillip A. Hollinshead, Harrison City, PA (US); Alexander D. Perelman, Richmond, VA (US); Oscar L. Martin, Jr., Midlothian, VA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 11/411,242

(22) Filed: Apr. 26, 2006

(65) Prior Publication Data

US 2007/0036497 A1    Feb. 15, 2007

(51) Int. Cl.
*G02B 6/44* (2006.01)
(52) U.S. Cl. .................................................. 385/107
(58) Field of Classification Search .................. 385/107
See application file for complete search history.

(56) References Cited

U.S. PATENT DOCUMENTS

| | | | |
|---|---|---|---|
| 3,485,938 A | 12/1969 | Kingsley | |
| 3,602,633 A | 8/1971 | Miller et al. | |
| 3,681,515 A | 8/1972 | Mildner | 174/107 |
| 4,097,119 A | 6/1978 | Kumamaru et al. | 350/96.23 |
| 4,109,099 A | 8/1978 | Dembiak et al. | 174/107 |
| RE30,228 E | 3/1980 | Silver et al. | |
| 4,340,771 A | 7/1982 | Watts | |
| 4,378,462 A | 3/1983 | Arnold, Jr. et al. | 174/70 |
| 4,449,014 A | 5/1984 | Brezinsky | 174/107 |
| 4,484,023 A | 11/1984 | Gindrup | 174/102 |
| 4,533,784 A | 8/1985 | Olyphant, Jr. | |
| 4,647,720 A | 3/1987 | Vokey | 174/107 |
| 4,671,611 A | 6/1987 | Allemand et al. | |
| 4,731,504 A | 3/1988 | Achille et al. | 174/107 |
| 4,740,261 A | 4/1988 | Moser | 156/244.12 |
| 4,763,983 A | 8/1988 | Keith | 350/96.23 |

(Continued)

FOREIGN PATENT DOCUMENTS

JP        06187843 A       7/1994

OTHER PUBLICATIONS

Kissell, J.R., S.G. Pantelakis, G.N. Haidemenopoulos, Aluminum and Aluminum Alloys, Chapter 9, Handbook of Advanced Materials, online Jun. 8, 2004. (Relevant pages enclosed, full chapter available upon request.).*

(Continued)

*Primary Examiner*—Charlie Peng
(74) *Attorney, Agent, or Firm*—Greenberg Traurig LLP

(57) ABSTRACT

Disclosed is an armored electrical or optical cable that includes at least one flexible elongated conducting member for conducting electrical or optical signals and an armor layer surrounding the conducting member, the armor layer including a 5xxx aluminum alloy having greater than 3 wt. % Mg. Such aluminum alloys include, e.g., 5182. Other alternative alloys are disclosed. In one embodiment, the aluminum alloy material is a 5xxx alloy material having an elongation that is 8% or greater, a tensile yield strength that is 207 MPa (30 ksi) or greater, and an ultimate tensile strength that is 276 MPa (40 ksi) or greater. The disclosed armor layer provides substantial weight reduction and cost benefits over steel cable armor, is more environmentally friendly than steel, and has physical properties that are comparable to or better than that of steel.

25 Claims, 7 Drawing Sheets

U.S. PATENT DOCUMENTS

| | | | |
|---|---|---|---|
| 5,095,176 A | 3/1992 | Harbrecht et al. | 174/23 |
| 5,243,876 A | 9/1993 | Mang et al. | 74/502.5 |
| 5,246,770 A | 9/1993 | Bottiglione et al. | 428/244 |
| 5,298,284 A | 3/1994 | Buckwald et al. | 427/203 |
| 5,380,376 A * | 1/1995 | Fortin et al. | 148/440 |
| 5,408,562 A | 4/1995 | Yoshizawa et al. | |
| 5,642,452 A | 6/1997 | Gravely et al. | 385/113 |
| 5,649,041 A | 7/1997 | Clyburn, III et al. | 385/109 |
| 5,770,274 A | 6/1998 | Christel | 427/535 |
| 5,777,271 A * | 7/1998 | Carlson et al. | 174/107 |
| 6,003,565 A | 12/1999 | Whittier, II et al. | 139/420 |
| 6,049,647 A | 4/2000 | Register et al. | 385/101 |
| 6,173,100 B1 | 1/2001 | Newton et al. | 385/102 |
| 6,195,486 B1 | 2/2001 | Field et al. | 385/100 |
| 6,198,865 B1 | 3/2001 | Risch | 385/113 |
| 6,255,591 B1 | 7/2001 | Ziemek | |
| 6,256,438 B1 * | 7/2001 | Gimblet | 385/109 |
| 6,287,679 B1 | 9/2001 | Pappas et al. | 428/304.4 |
| 6,294,268 B1 | 9/2001 | Muraoka et al. | 428/515 |
| 6,463,199 B1 | 10/2002 | Quinn et al. | 385/109 |
| 6,529,663 B1 | 3/2003 | Parris et al. | 385/113 |
| 6,631,229 B1 | 10/2003 | Norris et al. | 385/109 |
| 6,693,241 B2 | 2/2004 | Carlson et al. | |
| 6,785,450 B2 | 8/2004 | Wagman et al. | 385/100 |
| 6,897,382 B2 | 5/2005 | Hager et al. | |
| 7,027,696 B2 | 4/2006 | Nechitailo | |
| 7,084,343 B1 | 8/2006 | Visser | |
| 7,092,605 B2 | 8/2006 | Adams et al. | |
| 7,099,542 B2 | 8/2006 | Ledbetter et al. | |
| 7,179,522 B2 | 2/2007 | Hiel et al. | |
| 7,180,000 B2 | 2/2007 | Hager et al. | |
| 7,206,482 B2 | 4/2007 | Rhyne et al. | |
| 2003/0201115 A1 | 10/2003 | Carlson et al. | |
| 2004/0151448 A1 | 8/2004 | Adams et al. | 385/113 |
| 2005/0136257 A1 | 6/2005 | Easter | 428/375 |

OTHER PUBLICATIONS

"International Alloy Designations and Chemical Composition Limits for Wrought Aluminum and Wrought Aluminum Alloys," Unified North American and International Registration Records, *The Aluminum Association, Inc.* (Apr. 2004), pp. 1-25.

* cited by examiner

|  | ECCS | Embodiment 1 | Embodiment 2 |
|---|---|---|---|
| Gauge | 0.15mm (0.006-in.) | 0.15mm (0.006-in.) | 0.23mm (0.009-in.) |
| Width | - | 0.94m (37-in.) | 0.94m (37-in.) |
| Tensile- UTS | 352 MPa (51 ksi) | 345 MPa (50 ksi) | 345 MPa (50 ksi) |
| Tensile- TYS | 255 MPa (37 ksi) | 290 MPa (42 ksi) | 276 MPa (40 ksi) |
| Elongation, % | 30 | 10 | 13 |
| Weight | 1235 g/m$^2$ (757 lbs/rm) | 404 g/m$^2$ (248 lbs/rm) | 607 g/m$^2$ (372 lbs/rm) |
| Yield | 0.810 m$^2$/kg (0.571 msi/lb) | 2.473 m$^2$/kg (1.742 msi/lb) | 1.648 m$^2$/kg (1.161 msi/lb) |

FIG. 2

CHEMICAL COMPOSITION LIMITS

| AA No. | Si | Fe | Cu | Mn | Mg | Cr | Ni | Zn | Ti | Ga | V | Other Metallic Elements Each | Other Metallic Elements Total |
|---|---|---|---|---|---|---|---|---|---|---|---|---|---|
| 5182 | 0.20 | 0.35 | 0.15 | 0.20-0.50 | 4.0-5.0 | 0.10 | .... | 0.25 | 0.10 | .... | .... | 0.05 | 0.15 |
| 5154 | 0.25 | 0.40 | 0.10 | 0.10 | 3.1-3.9 | 0.15-0.35 | .... | 0.20 | 0.20 | .... | .... | 0.05 | 0.15 |
| 5154A (UK) | 0.50 | 0.50 | 0.10 | 0.50 | 3.1-3.9 | 0.25 | .... | 0.20 | 0.20 | .... | .... | 0.05 | 0.15 |
| 5154B (Italy) | 0.35 | 0.45 | 0.05 | 0.15-0.45 | 3.2-3.8 | 0.10 | 0.01 | 0.15 | 0.15 | .... | .... | 0.05 | 0.15 |
| 5254 | 0.45 Si+Fe | | 0.05 | 0.01 | 3.1-3.9 | 0.15-0.35 | .... | 0.20 | 0.05 | .... | .... | 0.05 | 0.15 |

*FIG. 5*

ALUMINUM ALLOYS FOR ARMORED CABLES

This application is related to U.S. patent application Ser. No.11/092,260, filed Mar. 29,2005, entitled "Multi-Layer Water Blocking Cable Armor Laminate Containing Water Swelling Fabrics," which is hereby incorporated by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of buried optical and electrical cables, and in particular to novel armored cables having a protective layer which includes an aluminum alloy.

BACKGROUND OF THE INVENTION

For over 30 years, buried cables for filled telephone cables were required to meet ASTM B736 which specifies a 0.15 mm (0.006-in.) electrolytic chromium coated steel (ECCS) shield for protection. ECCS is a single reduced tin mill black plate electrolytically coated steel with chromium and chromium oxide. This steel grade has been specified in the fiber optic cable industry for over 25 years. This steel specification was specified for corrosion resistance, protection against rodents, lightning resistance, and use in the field.

At the time the ASTM B736 specification was developed, steel was easily acquired and produced in the U.S. It could also be imported from Japan and a few other countries, and offered at relatively low cost. Unfortunately, there is no longer a U.S. producer and it is getting more difficult to find companies willing to supply this steel. Because of the supply position and the rapid industrialization in China, the cost of steel doubled from 2004 to 2005.

From a flexible packaging perspective the steel used for armored cable is a heavy-gauge product at 0.15 mm (0.006-in.) steel, but this is not the case in the steel industry in general. The 0.15 mm (0.006-in.) gauge is very light for steel mill production and is the preferred minimum gauge level for steel mills that make this product. Although such mills can produce lighter steel, this is very difficult and more expensive.

A study entitled "Corrosion Evaluation of Underground Cable Shielding Materials" conducted by NTIS evaluated various metal and film combinations. These materials were buried in 3 test soil conditions at 1-7 year time frames. Bare aluminum of the 1100 alloy type proved to corrode under some of these conditions. However, the aluminum foil with Ethylene Acrylic Acid (EAA) coated on both sides showed excellent corrosion resistance.

OBJECTS AND SUMMARY OF THE INVENTION

It is therefore an object of the invention to create an armor layer for electrical or optical cable which provides performance comparable to that of steel, but which provides advantages in terms of cost, weight, availability, and/or mechanical or electrical properties.

In one embodiment, the invention provides an armored electrical or optical cable that includes at least one flexible elongated conducting member for conducting electrical or optical signals and an armor layer surrounding the conducting member, the armor layer including a 5xxx aluminum alloy having greater than 3 wt. % Mg. Such aluminum alloys include, but are not limited to, 5182. In one embodiment, the aluminum alloy material is a 5xxx alloy material having an elongation that is 8% or greater, a tensile yield strength that is 207 MPa (30 ksi) or greater, and an ultimate tensile strength that is 276 MPa (40 ksi) or greater. The cable armor of the invention provides substantial weight reduction and cost benefits over steel cable armor, is significantly more environmentally friendly than steel, and has physical properties that are comparable to or better than that of steel.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 2 is a table showing the specifications for aluminum alloy materials in accordance with two embodiments of an armor wrap of the invention, along with those of uncoated ECCS steel.

FIG. 5 is a table showing the chemical composition limits of certain metallic elements for three aluminum alloys that are useful in practicing the invention.

DETAILED DESCRIPTION OF THE PREFERRED EMBODIMENT

The invention provides an aluminum alloy armor for electrical and optical cables that can function comparably to or better than steel, can become approved by the fiber optical and copper cable industry, and can provide significant cost advantages over steel. Aluminum is light in weight, highly resistant to corrosion, strong in alloys, nonmagnetic, nontoxic, highly workable and relatively easy to use. Aluminum further offers powerful economic incentives because it is recyclable.

The invention in one embodiment includes an armor wrap comprising a specially treated alloy selected from the Aluminum Association's designation 5182. The invention thus provides a material that has some similar physical properties to ECCS tin-free steel. The aluminum alloy utilized may vary in thickness according to the physical properties requirements. For example, the material may be between 0.08 mm (0.003-in.) and 0.3 mm (0.012-in.) depending upon the particular application. The material may be coated with an ethylene acrylic acid (EAA) coating on one or both sides. The thickness of the EAA coating will be determined by the requirement to approach the specific properties needed for a particular application. The aluminum alloy material utilized in the invention may be worked to provide an H1X temper, e.g., an H19 (worked, extra hard) temper. The material may be stabilized or partial annealed to an H3X or H2X temper.

Figure 1:
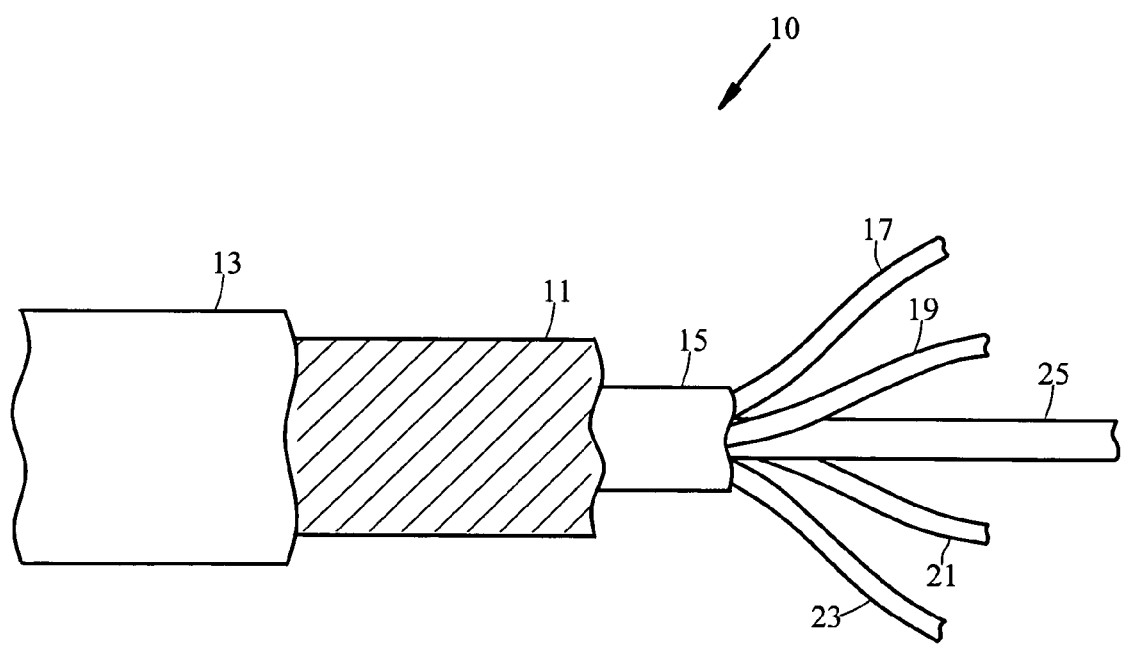
FIG. 1 shows a side elevation view illustrating a cable having an armor cable wrap in accordance with one embodiment of the invention.

FIG. 1 shows a cable 10 having an armor cable wrap 11 in accordance with one embodiment of the invention. The cable may be, e.g., an optical fiber cable, a copper cable, or other cable for conducting optical or electrical signals via one or more flexible conductors 17-23. The armor wrap 11 of the invention is surrounded by an outer jacket 13. An inner jacket 15 may also be provided. The outer jacket 13 and the inner jacket 15 may be fabricated from low-density polyethylene materials. The low density polyethylene used in the outer jacket 13 can either be the same type of low density polyethylene used in the inner jacket 15 or of a different type. One or more support members 25 may be utilized to provide structural support to cable 10.

The aluminum alloy of the invention can be chosen such that, when treated appropriately, the alloy has comparable tensile strength to ECCS. The 0.15 mm (0.006-in.) and a 0.23 mm (0.009-in.) gauge versions of 5182-H19 are particularly favorable for this application, but it will be understood that the invention is not limited to such material. This material is designated 5182-H19 when cold-rolled only, and the temper designation then becomes H2X or H3X when partial annealed, or stabilized, respectively. In one embodiment, a 5182-H19 material is partial annealed to provide a 5182-H26 or 5182-H28 material.

Shown in the table of FIG. 2 are the specifications for aluminum alloy materials in accordance with two embodiments of an armor wrap of the invention, along with those of uncoated ECCS steel. Embodiment 1 is an uncoated annealed 5182 alloy material at 0.15 mm (0.006-in.) gauge, and Embodiment 2 is an uncoated annealed 5182 alloy material at 0.23 mm (0.009-in.) gauge.

Figure 3A:
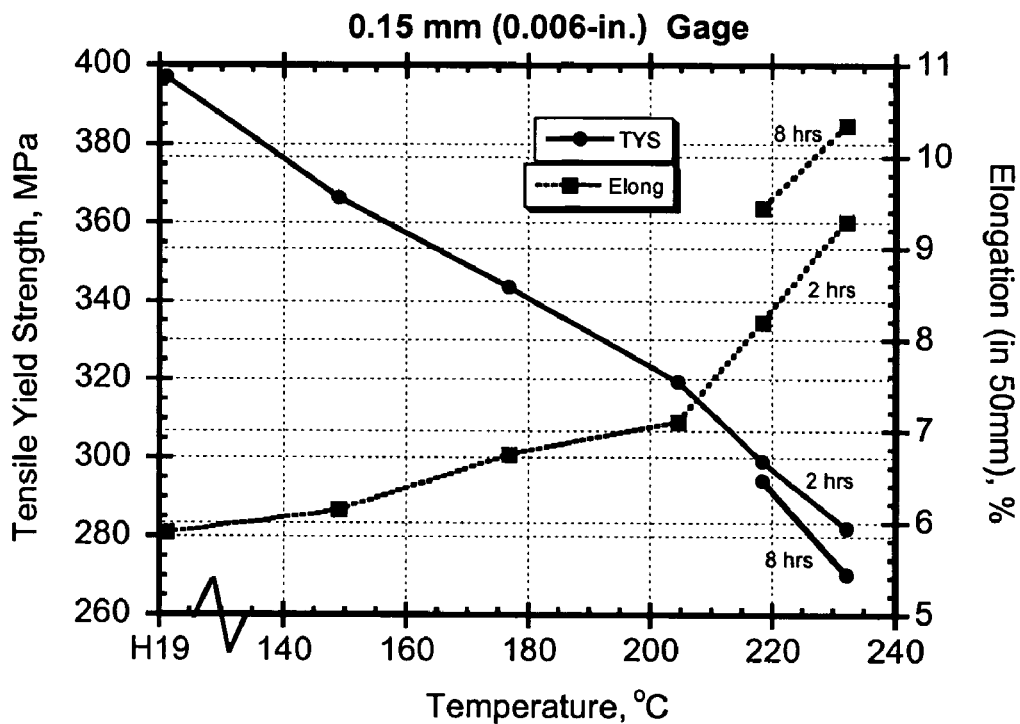
FIGS. 3a and 3b show graphical results illustrating, for two gauges of the 5182 alloy, the relationship between tensile yield strength and elongation, as a function of anneal temperature, dwell, and aluminum gauge.
Figure 3B:
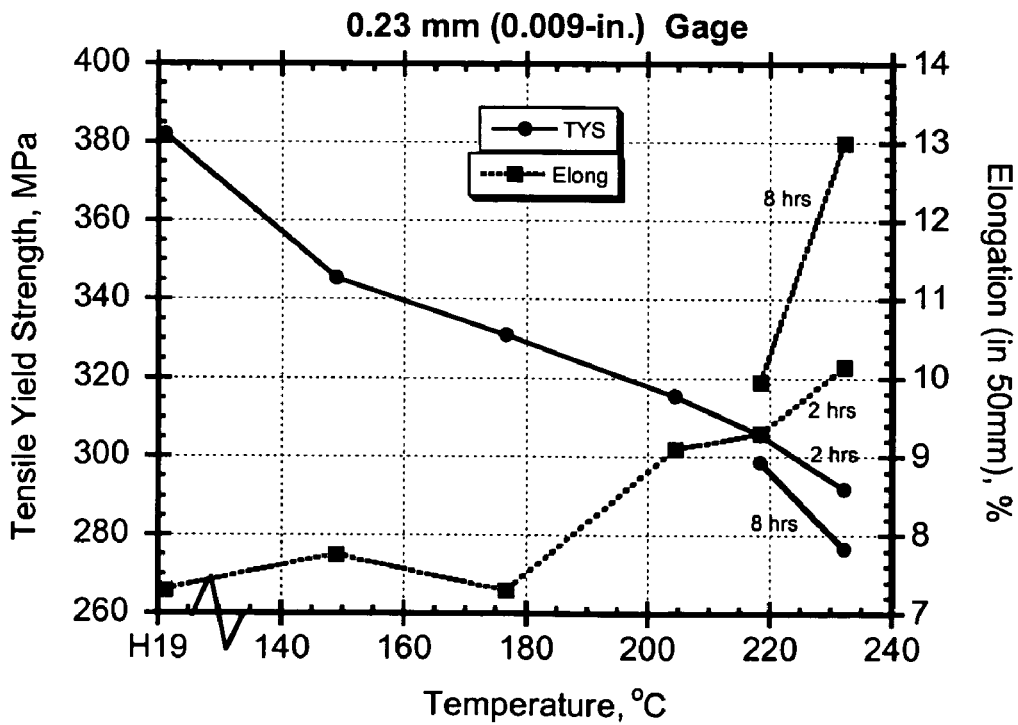

To increase its elongation properties, the alloy used for the armor wrap can be annealed at the required temperature and dwell time. FIGS. 3a and 3b show graphical results illustrating, for two gauges of the 5182 alloy, the relationship between tensile yield strength (ksi) and elongation, as a function of anneal temperature, dwell, and aluminum gauge. The maximum elongation achieved was 10% (although 13% elongation was achieved for 0.23 mm (0.009-in.) gage with an eight-hour partial anneal, this may be considered an 'outlier'), relative to 30% for ECCS. The aluminum alloy material utilized for the armor wrap in accordance with the invention may be corrugated to improve elongation performance in actual cable test results, and thus the lower elongation as measured in the present tests should not cause a problem for bend and flex tests.

Figure 4:
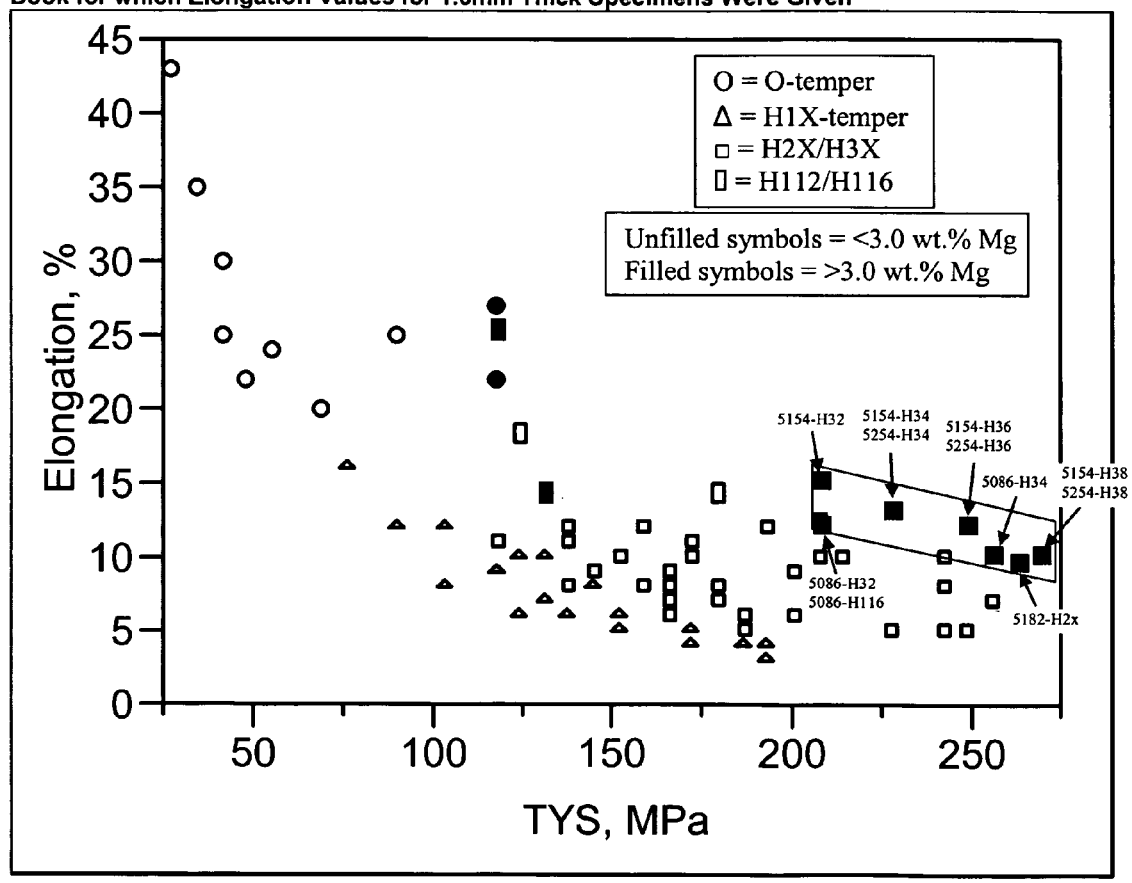
FIG. 4 is a plot of elongation against yield strength for certain 1xxx, 3xxx and 5xxx alloys, in various tempers.

Alternative alloys-tempers other than the 5182 alloy discussed above may be utilized in the armor wrap within the scope of the invention. FIG. 4 shows a plot of elongation against yield strength for all the 1xxx, 3xxx and 5xxx alloys in the Aluminum Association's Aluminum Standards and Data book for which elongations for 1.6 mm (1/16-in.) thick specimens were provided, and additionally includes a 5182-H2X candidate alloy material produced in this work. As can be seen in the plot and delineated by the data points within the parallelogram, 5xxx alloys with fairly high Mg (>3.0 wt. %) and in H2x, H3x, or H116 tempers are the only ones tested that have acceptable elongation (8% or greater, preferably 10% or greater) at the strength levels 207 MPa (30 ksi) or greater tensile yield strength, preferably 241 MPa (35 ksi) or greater tensile yield strength; 276 MPa (40 ksi) or greater ultimate tensile strength, preferably 310 MPa (45 ksi) or greater ultimate tensile strength) that are required for the armor wrap of the invention. FIG. 4 shows that alloys with greater than 3 wt. % Mg in H2X, H3X or H116 tempers are capable of giving the required combination of high elongation (>8, or 10%) and high strength (TYS>207 MPa/30 ksi, or 241 MPa/35 ksi). The 5154 data in various tempers in the plot (~3.5 wt. % Mg, <0.10 wt % Mn, 5254 superimposed on the 5154 data) indicates that it may provide a slightly improved combination of properties.

FIG. 5 shows the chemical composition limits of certain metallic elements for the 5182 alloy, three variations of the 5154 alloy, and the 5254 alloy, per the Aluminum Association's International Alloy Designations and Chemical Composition Limits for Wrought Aluminum and Wrought Aluminum Alloys, which is incorporated by reference herein in its in entirety.

Fiber optic cables are tested to meet or exceed the specifications of Bellcore GR-20-CORE, Generic Requirements for optical fiber cables. Copper and other cables are typically tested in accordance with the Rural Utilities Service (RUS), formerly REA, standards and standard specification B736 for aluminum, aluminum alloy and aluminum-clad steel cable shielding stock. For fiber optic cables intended for premise applications, Bellcore GR-409-CORE, Generic Requirements for Premises Fiber Optic Cable, is used as the qualification standard.

Armored optical fiber and copper cable is often exposed to the most rugged of installation environments. It is expected to stand up to direct burial in rocky terrain, the tenacious jaws of aggressive rodents, and to be able to withstand lightning strikes as well. It is imperative that this armor protects its fiber optic core throughout the cable's life. Thus, armored optical fiber and copper cable is typically required to meet the following requirements: gopher, corrosion, and lightning resistance; ANSI/ICEA S-87-640-1992; shovel, backhoe, digging; compression, and shotgun resistance; can be processed and coiled successfully; and has mechanical properties suitable for field use.

Rolls of two gauges 0.15 mm and 0.25 mm (0.0058-in. and 0.0098-in.) of partial annealed 5182 alloy were laminated with EAA film under the same process conditions set for steel, and no problems were encountered. Both trials passed the film peel test, film-to-film adhesion, and tensile test. Elongation was at an acceptable level, although below normal standard steel.

Corrugation tests were also conducted, and the materials were deemed suitable for cable armor applications. Tests were performed with a lab corrugator, and showed no problems in aggressively corrugating both EAA-coated gauges of 5182 without using oil lubricant.

A Gopher test protocol was designed to determine the resistance of various cable and duct designs and materials to damage by plains pocket gophers (Geomys bursarius). Damage by pocket gophers to underground cables and fiber-optic splice ducts (closures) causes significant economic losses to the communication and power industries. Effective laboratory screening of the potential for pocket gopher damage to cables and ducts provides the initial data for field evaluations.

Figure 6A:
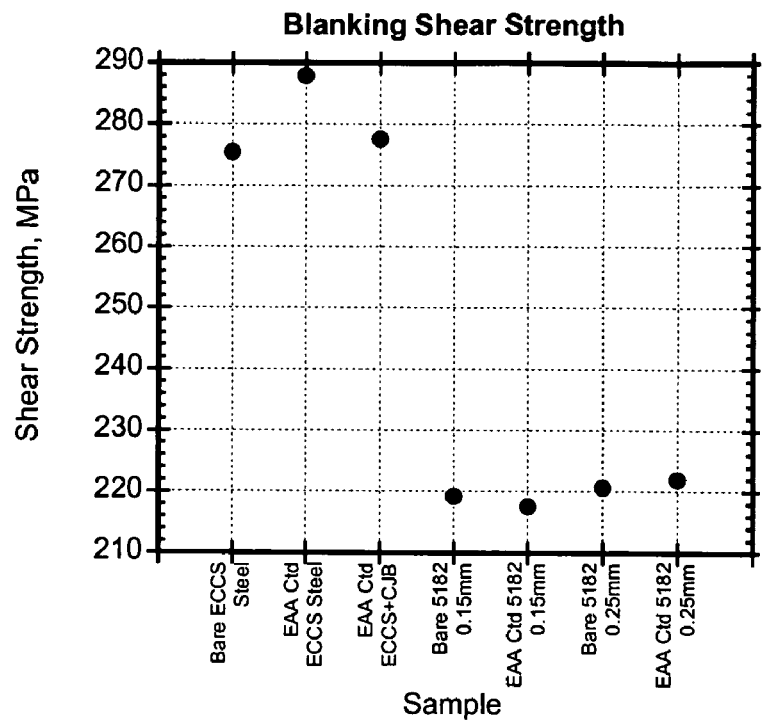
FIGS. 6a and 6b are graphical illustrations showing the results of mechanical properties tests of four aluminum samples (two gauges×bare and EAA coated) in accordance with certain embodiments of the invention as against three incumbent steel samples.
Figure 6B:
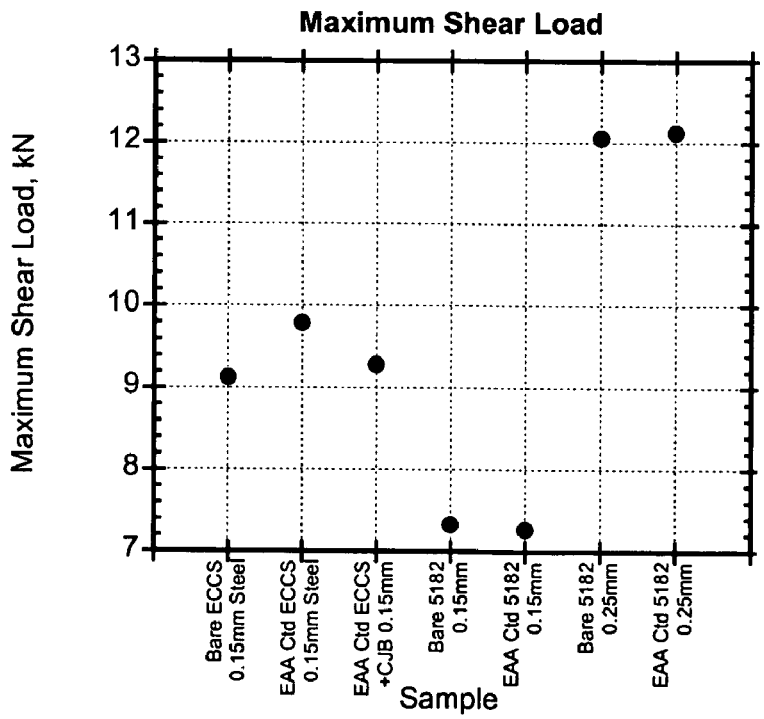

FIGS. 6*a* and 6*b* show the results of mechanical properties tests of four aluminum samples (two gauges×bare and EAA coated) in accordance with certain embodiments of the invention as against three incumbent steel samples. While the steel samples showed approximately 25% higher shear strength over the 5182 aluminum alloy samples (see FIG. 6*a*), the maximum shear load as shown in FIG. 6*b* is a better indicator of gopher resistance since resistance to penetration is thickness dependent. The 0.15 mm (0.0058-in.) sample of 5182 alloy showed a maximum shear load lower than that of steel at the same gauge. However, the 0.25 mm (0.0098-in.) sample of 5182 alloy performed better than the steel. In view of this, for applications that require 'gopher resistance' that matches that of the steel incumbents, one can either up gauge ~25% from 0.15 mm to 0.19 mm (0.0058-in. to 0.0073-in.) at the same strength level, or increase the shear strength of the 0.15 mm (0.0058-in.) 5182 alloy material by ~25%.

Figure 7:
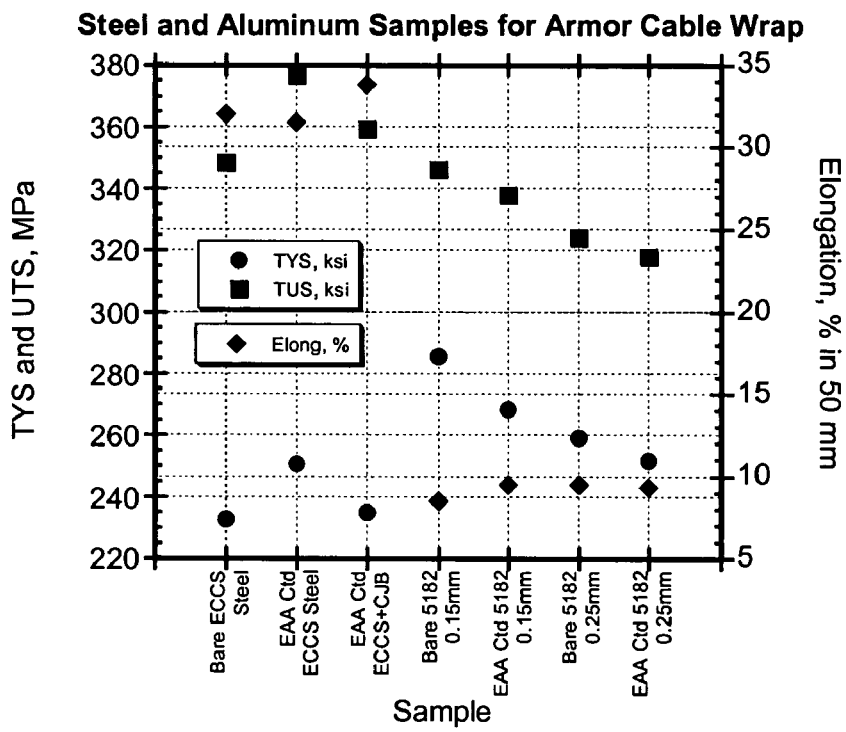
FIG. 7 is a graphical illustration showing elongation data and strength for bare and EAA-coated 5182 alloy material at both the 0.15 mm (0.0058-in.) and 0.25 mm (0.0098-in.) gauges as against steel.

The latter can be done by using a less-aggressive stabilization practice, but this will negatively impact elongation. FIG. 7 shows elongation data and strength for bare and EAA-coated 5182 alloy material at both the 0.15 mm (0.0058-in.) and 0.25 mm (0.0098-in.) gauges as against steel. Although the selected aluminum alloys with adequate strength do not have elongations greater than 15% like the incumbent ECCS materials, they can perform functionally at or above the level of the incumbent ECCS in all other regards.

Figure 8:
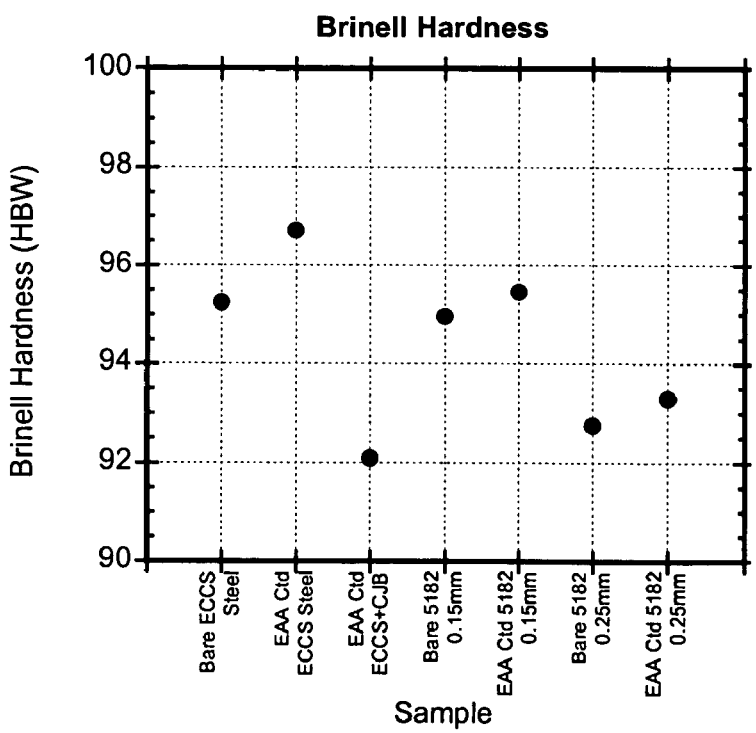
FIG. 8 is a graphical illustration showing the results of hardness testing for bare and EAA-coated 5182 alloy material at both the 0.15 mm (0.0058-in.) and 0.25 mm (0.0098-in.) gauges as against steel.

FIG. 8 shows the results of hardness testing for bare and EAA-coated 5182 alloy material at both the 0.15 mm (0.0058-in.) and 0.25 mm (0.0098-in.) gages as against steel. The 5182 alloy materials showed Brinell hardness levels comparable to those of the incumbent steel materials, and within the requirements for armor cable wrap applications.

Thus, the cable armor comprising aluminum alloy of the invention in the various embodiments described above offers attributes similar to steel, as well as several new advantages as follows. The invention provides substantial weight reduction by approximately one-half to two-thirds that of steel. For example, 25 mm (1.0-in.) width slit pad, 2300 m (2500 yards), of coated steel at 0.15 mm (0.006-in.) weighs approximately 75 kg (165 pounds) compared to an alternative 0.15 mm (0.006-in.) new coated aluminum 5182 alloy pad weighing 30 kg (65 pounds). This lighter weight will allow easy handling by operators and loading of pads on the cable line. The armor material, and cables utilizing it, will indeed be easier to handle by all parties involved from the manufacturer to the field technicians who install the cable. In this regard, the invention further provides freight and yield savings in that, for example, a single truckload of cable may be shipped instead of two or three trucks for the same application.

The cable armor of the invention provides improved corrosion resistance, particularly when the outer protective shield is torn or scratched, exposing the armor material to water, humidity, or other corrosive elements. The cable armor of the invention is environmentally friendly in that it can be recycled, can be manufactured using recycled material, and the scrap produced in the manufacturing process can be recycled for other applications. The raw materials for producing the cable armor of the invention are in abundant supply in the U.S. and other locations around the world, and are typically less expensive than steel per dimensional volume. The cable armor of the invention further provides the mechanical and electrical properties required for use in buried cables, as set forth in detail above.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A cable, comprising:
    at least one flexible elongated conducting member for conducting electrical or optical signals;
    an armor layer surrounding said conducting member,
    wherein the armor layer is formed as a longitudinally rolled and seamed tubular layer,
    wherein the armor layer is corrugated,
    the armor layer comprising a 5xxx aluminum alloy having greater than 3 wt. % Mg, wherein the aluminum alloy has been treated to a temper, which is one of H1X, H2X and H3X;
    the armor layer having a thickness less than 0.3 mm (0.012-in.).

2. The armored cable in accordance with claim 1, wherein said 5xxx aluminum alloy comprises a 5182 alloy.

3. The armored cable in accordance with claim 1, wherein said 5xxx aluminum alloy comprises a 5154 alloy.

4. The armored cable in accordance with claim 1, wherein said 5xxx aluminum alloy comprises a 5254 alloy.

5. The armored cable in accordance with claim 1, wherein said aluminum alloy is partial annealed to an H25, H26, or H28 temper.

6. The armored cable in accordance with claim 1, wherein said armor layer is bare.

7. The armored cable in accordance with claim 1, wherein said armor layer is coated with ethylene acrylic acid.

8. The armored cable in accordance with claim 1, wherein said conducting member is an optical fiber.

9. The armored cable in accordance with claim 1, wherein said conducting member is an electrical conductor.

10. The armored cable in accordance with claim 1, further comprising at least one inner jacket between said armor layer and said conducting member.

11. The armored cable in accordance with claim 1, further comprising at least one outer jacket surrounding said armor layer.

12. The armored cable in accordance with claim 1, wherein said 5xxx aluminum alloy comprises a 5042 alloy.

13. A cable, comprising:
    at least one elongated conducting member for conducting electrical or optical signals;
    an armor layer surrounding said conducting member,
    wherein the armor layer is formed as a longitudinally rolled and seamed tubular layer,
    wherein the armor layer is corrugated, the armor layer comprising an aluminum alloy selected from the group consisting of:
        aluminum alloys having an Aluminum Association designation of 5042,
        aluminum alloys having an Aluminum Association designation of 5182,
        aluminum alloys having an Aluminum Association designation of 5154,
    and aluminum alloys having an Aluminum Association designation of 5254, wherein the aluminum alloy has been treated to a temper, which is one of H1X, H2X and H3X;
    the armor layer having a thickness less than 0.3 mm (0.012-in.).

14. The armored cable in accordance with claim 13, wherein said aluminum alloy is partial annealed to an H25, H26, or H28 temper.

15. The armored cable in accordance with claim 13, wherein said conducting member is an optical fiber.

16. The armored cable in accordance with claim 13, wherein said conducting member is an electrical conductor.

17. The armored cable in accordance with claim 13, further comprising at least one inner jacket between said armor layer and said conducting member.

18. The armored cable in accordance with claim 13, further comprising at least one outer jacket surrounding said armor layer.

19. The armored cable in accordance with claim 13, wherein said armor layer is corrugated.

20. The armored cable according to claim 13, wherein the armor layer has a thickness between 0.08 mm (0.003 in.) and 0.3 mm (0.012 in.).

21. A cable, comprising:
   at least one elongated conducting member for conducting electrical or optical signals;
   an armor layer surrounding said conducting member,
   wherein the armor layer is formed as a longitudinally rolled and seamed tubular layer,
   wherein the armor layer is corrugated, the armor layer comprising an aluminum alloy selected from the group consisting of:
      aluminum alloys having an Aluminum Association designation of 5042, aluminum alloys having an Aluminum Association designation of 5182, aluminum alloys having an Aluminum Association designation of 5154, and aluminum alloys having an Aluminum Association designation of 5254, wherein the aluminum alloy has been treated to a temper, which is one of H1X, H2X and H3X;
   wherein said armor layer is coated with ethylene acrylic acid.

22. A cable, comprising:
   at least one flexible elongated conducting member for conducting electrical or optical signals;
   an armor layer surrounding said conducting member,
   wherein the armor layer is formed as a longitudinally rolled and seamed tubular layer,
   wherein the armor layer is corrugated,
   the armor layer comprising a 5xxx aluminum alloy material having an elongation that is 10% or greater,
   a tensile yield strength that is 207 MPa (30 ksi) or greater, and
   an ultimate tensile strength of 276 MPa (40 ksi) or greater, wherein the aluminum alloy has been treated to a temper, which is one of H1X, H2X and H3X;
   the armor layer having a thickness less than 0.3 mm (0.012-in.).

23. The armored cable in accordance with claim 22, wherein said aluminum alloy material has an elongation that is 10% or greater.

24. The armored cable in accordance with claim 22, wherein said aluminum alloy material has a tensile yield strength that is 193 MPa (28 ksi) or greater.

25. The armored cable in accordance with claim 22, wherein said aluminum alloy material has an ultimate tensile strength that is 262 MPa (38 ksi) or greater.

* * * * *